April 5, 1938.    R. R. GOBEREAU    2,113,478
AIR SCREW WITH AUTOMATICALLY VARIABLE PITCH
Filed April 9, 1936    3 Sheets-Sheet 3

UNITED STATES PATENT OFFICE 2,113,478

AIR SCREW WITH AUTOMATICALLY VARIABLE PITCH

Robert Richard Gobereau, Le Parc du Perreux, France

Application April 9, 1936, Serial No. 73,543
In France April 17, 1935

3 Claims. (Cl. 170—162)

The object of this invention is an air screw with automatically variable pitch and with centrifugal and aerodynamic compensation.

It has already been proposed to provide a variable pitch propeller having blades adjustable with respect to a hub. One type of such adjustment has been accomplished by centrifugal weights mounted so that the radial displacement of the centrifugal masses controls the relative movement of means so as to increase the propeller pitch as the radial displacement increases thus producing a balance between the propeller and engine torques and an optimum pitch of the blades. It has also been proposed to provide a main propeller having blades with variable pitch and an auxiliary propeller having a constant pitch connected to the main propeller by gearing. The resistance torque acting upon the constant pitch propeller varies and allows a certain relative motion between the gear parts of the hub to change the pitch of the propeller blades.

The present invention consists in an air screw or propeller with automatically variable pitch comprising in combination with an engine shaft, a casing carrying main propelling blades mounted rotatably on the shaft, said casing being connected to the engine shaft through the intermediary of connecting means including members constituting auxiliary propeller blades adapted when subjected simultaneously to the engine torque transmitted, to the centrifugal force, and to the reaction of the surrounding medium there results a variation of the angular displacement between the engine shaft and the casing. The main propelling blades are connected to the engine shaft by means so that their orientation is determined by this angular displacement with the object of ensuring at each instant the maximum efficiency for the air screw by determining the incidence of the propelling blades simultaneously by the engine torque transmitted and by the speed of rotation of the engine.

In the attached drawings, which represent by way of example a form of air screw with variable pitch according to the invention:—

Figure 1:
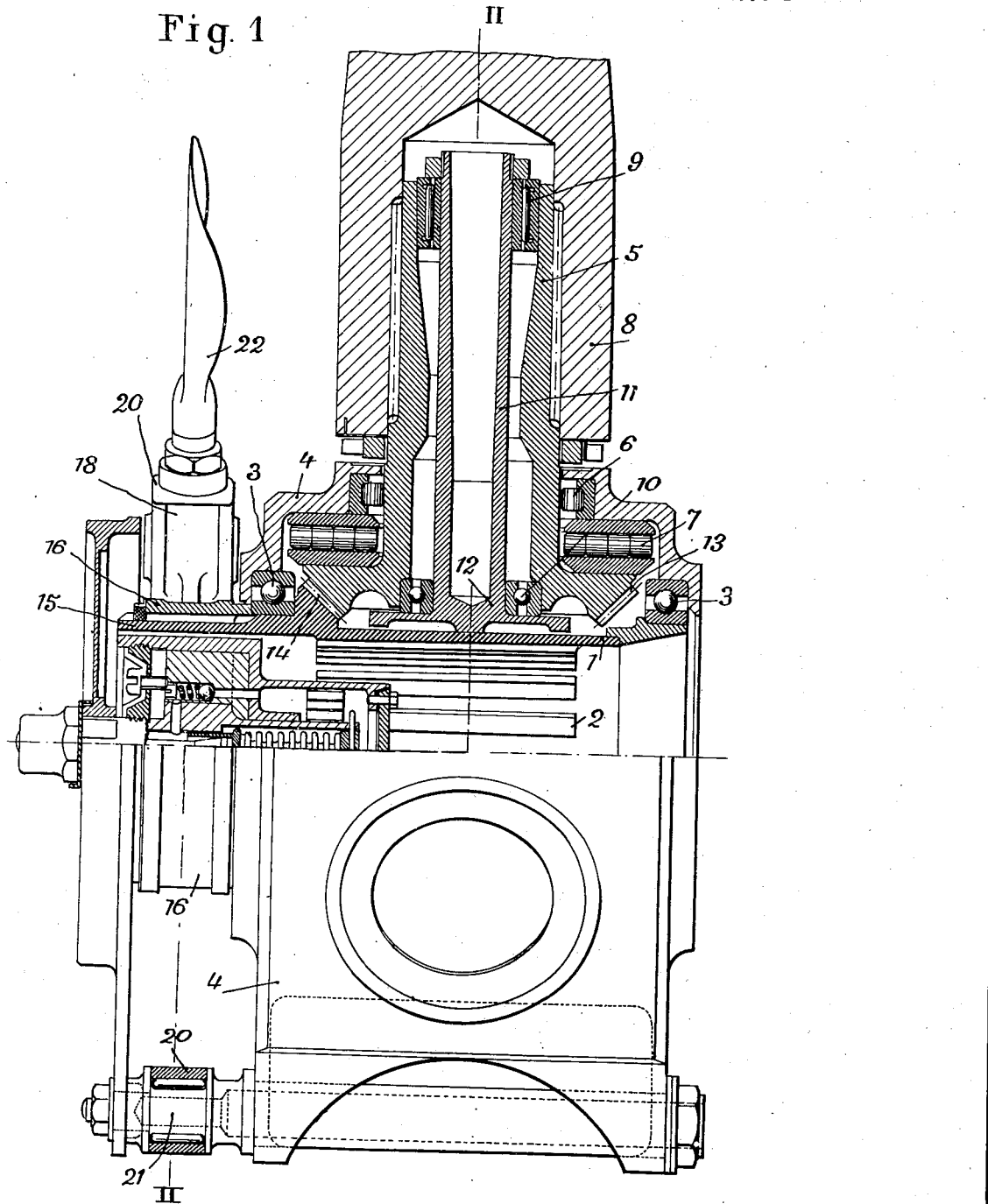
Fig. 1 is an elevation of the screw with half in axial section.

According to the invention the propeller boss comprises a stub shaft 1 which can be made integral with the engine shaft not shown, for example by splines 2. On this spindle a casing 4 can turn freely by the intermediary of ball bearings 3. The propelling blades 8 of the screw are mounted in this casing by means of sleeves 5, centered in the casing by an anti-friction roller bearing 6 and bearing on it by a thrust bearing having radial rows of rollers 7. The propelling blades may be of any desired number, three being shown in the example. The sleeve 5 is also centered by the aid of needle bearings 9 and ball bearings 10 on a guide stem 11 integral with a sleeve 12 which can rotate on the outside surface of the stub shaft 1. Finally each sleeve 5 carries a gear 13 which engages with a gear 14 of the stub shaft 1, these two gears connecting each propelling blade 8 of the screw to the stub shaft 1. On an extension 15 of the stub shaft is keyed a sleeve 16 carrying (Fig. 2) shafts 17 of an equal number as and having the same arrangement as the propelling blades 8 of the screw, on which are pivotally supported rods 18 hinged by a pivot 19 to a cranked lever 20 which itself can pivot on a shaft 21 integral with the casing 4, and of which one of the arms 22 is made in the form of a vane and presents a predetermined helicoidal profile with a pitch in the same direction as the driving blades 8 during forward operation.

It will be seen that if the stub shaft 1 which is integral with the engine shaft receives an angular displacement with respect to the casing 4, on the one hand this angular displacement produces rotation of each propelling blade 8 about its own axis by means of gears 13 and 14, and on the other hand an angular displacement of the vanes 22 of the cranked lever 20, this displacement being transmitted by the rod 18.

Figure 2:
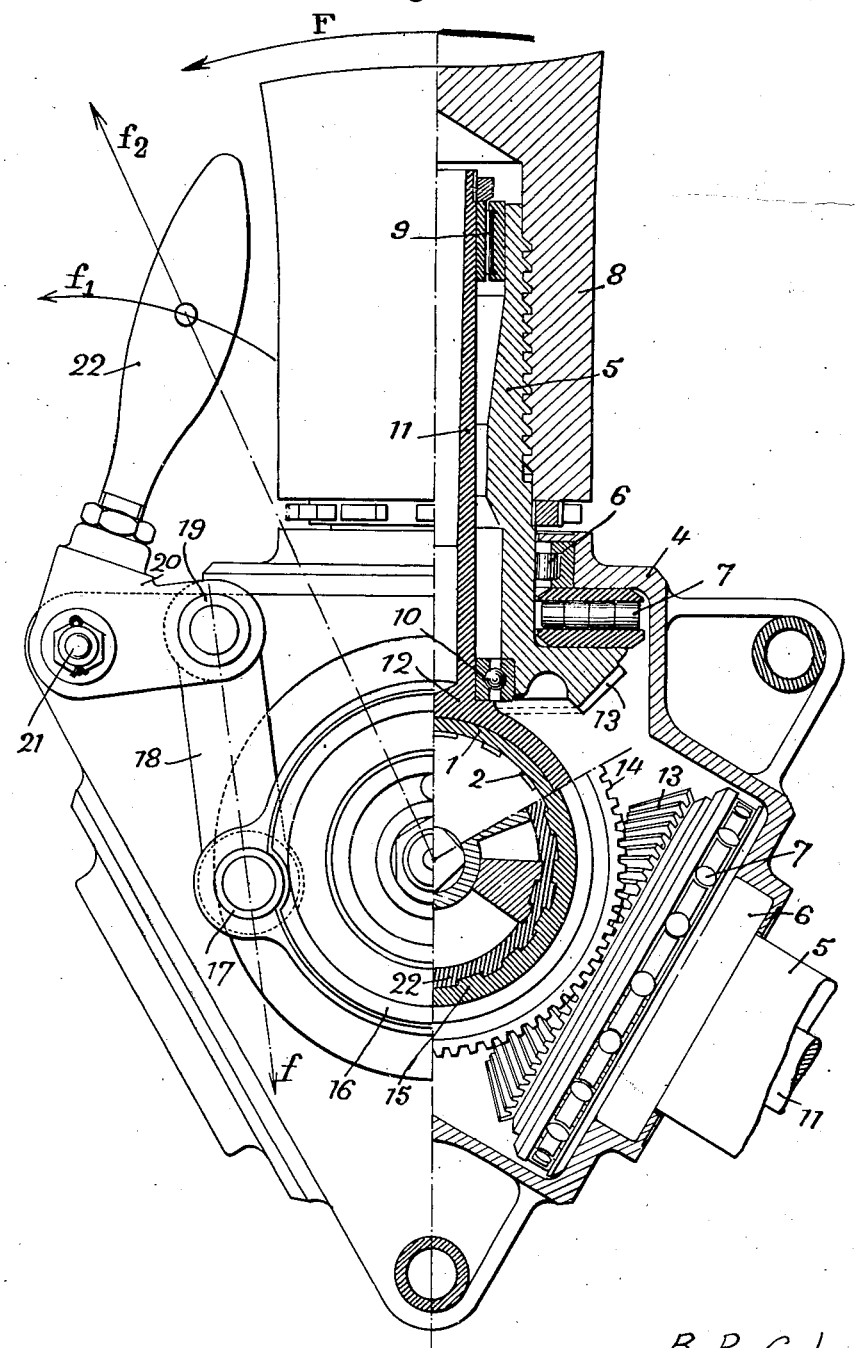
Fig. 2 is an end view with one half in axial section substantially along the line II—II of Fig. 1, and one half solid, the external support being removed.
Figure 3:
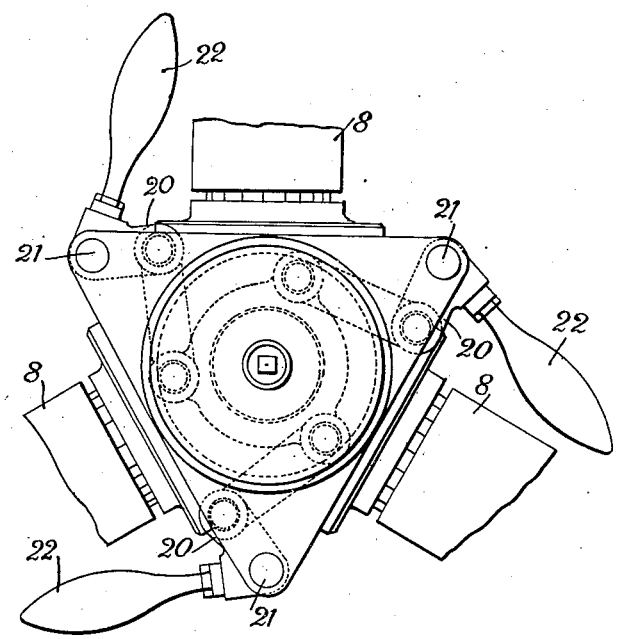
Fig. 3 is an outside end view of the screw.

The operation is as follows:

The engine couple operates on the stub shaft 1 to make it rotate in the direction of the arrow F in Fig. 2, the direction of rotation of the air screw being for example that of the arrow F. This engine torque operates on the one hand on the propelling blades 8 in order to make them rotate about their own axis and on the other hand on the rods 18 and the cranked lever 20 in order to produce the displacement of the vanes 22 in the opposite direction of the arrow $f^1$. When the engine turns the centrifugal forces operate on the vanes 22, these forces acting in the direction of the arrow $f^2$ in such a way that these vanes become displaced in the direction of the arrow $f^1$. The assembly becomes placed in balanced operation under the action of the following three forces which operate on it:—

The engine torque transmitted by the stub shaft 1;

The resisting torque which operates on the driving blades 8 of the screw;

The centrifugal and aerodynamic forces operating on the vanes 22.

In fact these vanes 22 present a profile such that the aerodynamic action exerted on them in consequence of their rotation with the assembly of the screw through the surrounding air varies according to the position of these vanes, a position which is itself determined by the speed of rotation of the screw. For this purpose the profile of the vanes is such that for the speed of rotation under the engine condition corresponding normally to a speed of translation given by the screw assembly, the aerodynamic forces on the vanes is zero, the pitch of the latter having a given value. If the engine turns more rapidly or more slowly the position of the center of gravity of the vanes 22 varying with respect to the center of rotation of the screw in consequence of the action of centrifugal force, the pitch of the vanes and consequently the aerodynamic action of the surrounding air on them also varies. As a consequence this aerodynamic action combining with the centrifugal force determines a compensation for variations in this centrifugal force, said variations being due to the displacement of the center of gravity of each of the vanes 22 with respect to the axis of rotation of the screw assembly.

When the engine starts the engine torque produces a primary rotation of the stub shaft 1 with respect to the casing 4 which as a result by operating on the rods 18 in the direction of the arrow $f$ brings the vanes 22 towards the casing in the opposite direction of the arrow $f^1$.

At the same time this primary rotation produces a rotation of each one of the propelling blades 8 about its own axis in such a way as to bring them to the position for which they have minimum incidence.

When the screw assembly begins to rotate the centrifugal force operates on each one of the vanes 22 producing its displacement in the direction of the arrow $f^1$, this displacement by means of the rods 18 producing a reduction in the angular displacement between the stub shaft 1 and the casing 4 in consequence of which the driving blades 8 receive a rotation in the reverse direction thereby progressively increasing their incidence, while on the other hand the pitch of these vanes which increases in proportion with this displacement tends to oppose the displacement and effects a correction of the displacement of the casing 4 taking account of the particular aerodynamic conditions of the assembly, said correction being determined by the construction of the vanes. The increase of the incidence of the driving blades 8 produces an increase in the resisting couple acting on the screw, this couple increasing until it balances the engine torque, at the number of revolutions for which the engine operating the screw has been constructed. It will be seen that by judicially determining the weight as well as the pitch of the vanes 22 it may be arranged that for a predetermined angular velocity the centrifugal force operating on these vanes will balance the action on the engine torque.

If for any reason and for any speed given to the engine the resisting torque diminishes (due to variations of the altitude in which the screw operates) the engine tends to increase in speed, this increase in speed producing a displacement of the vanes 22 which increases the angle of incidence of the propelling blades 8 and consequently the resisting torque which is thus brought back to its original value.

The shape of the vanes 22 also permits an improved correction and adjustment of the pitch for the screw to be obtained for the flying conditions at any instant. In fact with the variation given in the correction due to the reaction of the air surrounding the vanes, the incidence of the driving blades at low speeds of rotation will have less tendency to increase and consequently when starting the engine will be less braked, thus having a speed slightly greater than its working speed. The aerodynamic force takes place in the opposite direction to that due to the centrifugal force at low speeds, zero for a given speed, and in the same direction as the centrifugal force for high speeds.

The vehicle actuated by the air screw, such as an aeroplane, may thus take off more easily and will also rise better. For the operating speed of the engine the correction of the aerodynamic force is zero. On the other hand for higher speeds than the normal working speed this correction is added to the centrifugal force, the pitch of the screw is increased thereby slightly diminishing the number of revolutions of the engine and permitting an improved efficiency of the assembly.

In the screw described the propelling blades 8 may be subjected to a rotation of 90° about their own axis but this angular displacement may be any other desired.

The invention is applicable to air screws or the like and for all applications.

What I claim is:—

1. A variable pitch propeller comprising in combination with an engine shaft, a casing rotatably mounted on the shaft, a plurality of propeller blades carried by the casing, each of the propeller blades being rotatable around its longitudinal axis, a plurality of vanes movably mounted on said casing, means connecting said shaft with each of said vanes so that the vanes are subjected to movement simultaneously in response to the transmitting engine torque, to the centrifugal force set up by rotation of the engine shaft and to the action of the surrounding medium, means associated with each propeller blade for turning the blades and varying the pitch thereof in response to the angular displacement of said casing with respect to said shaft, the movement of said vanes varying said angular displacement whereby the incidence of the propeller blade is determined by the forces acting on said vanes.

2. A variable pitch propeller comprising in combination with an engine shaft, a casing rotatably mounted on the shaft, a plurality of propeller blades carried by the casing, each of the propeller blades being rotatable around its longitudinal axis, a plurality of vanes pivotably mounted on said casing, a crank lever carried by each vane, a rod pivotably connecting each of said levers to said shaft so that the vanes are pivotable simultaneously in response to the transmitted engine torque, to the centrifugal force set up by rotation of the engine shaft and to the reaction of the surrounding medium, means associated with each propeller blade for turning the blades and varying the pitch thereof in response to the angular displacement of said casing with respect to said shaft, the pivotable movement of said vanes varying said angular displacement whereby the pitch of the propeller blades is determined by the forces acting on said vanes.

3. A variable pitch propeller comprising in combination with an engine shaft, a casing rotatably mounted on the shaft, a plurality of propeller blades carried by the casing, each of the propeller blades being rotatable around its longitudinal axis, a plurality of vanes pivotably mounted on said casing, each of said vanes having a helicoidal aerodynamic profile with a pitch of the same direction as that of the propeller blade, means connecting said shaft with each of said vanes so that the vanes are subjected to movement simultaneously in response to said engine torque, to the centrifugal force set up by rotation of the engine shaft and to the reaction of the surrounding air, means associated with each propeller blade for turning the blades and varying the pitch thereof in response to the angular displacement of said casing with respect to said shaft, the pivotable movement of said vanes varying said angular displacement whereby the pitch of the propeller blades is determined by the forces acting on said vanes.

ROBERT RICHARD GOBEREAU.